(No Model.)
E. NORTON.
SOLDERING MACHINE.
No. 322,065. Patented July 14, 1885.
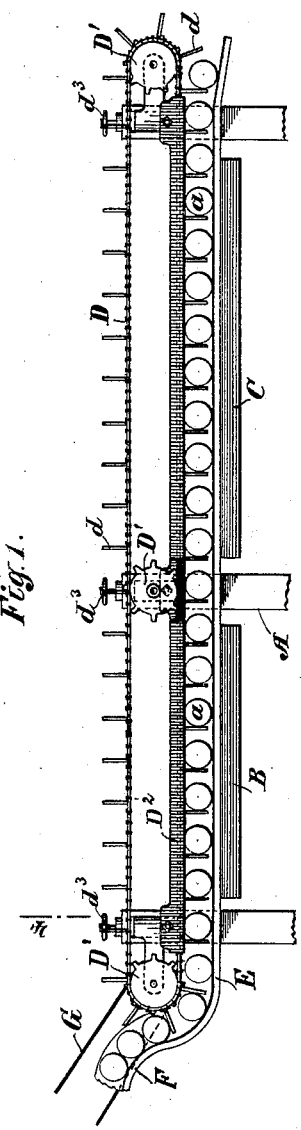
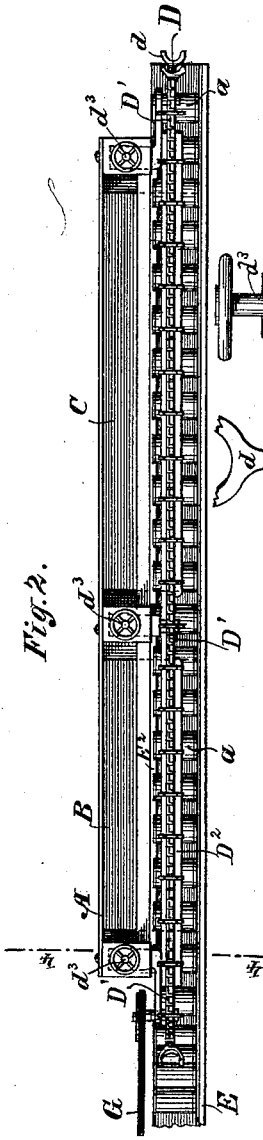
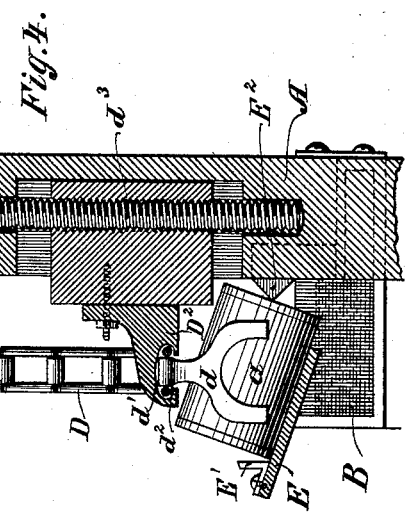
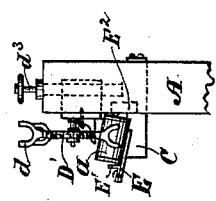
Witnesses:
Inventor: Edwin Norton,
Munday, Evarts and Adcock
his attys.

United States Patent Office.

EDWIN NORTON, OF CHICAGO, ILLINOIS, ASSIGNOR TO HIMSELF AND OLIVER W. NORTON, OF SAME PLACE.

SOLDERING-MACHINE.

SPECIFICATION forming part of Letters Patent No. 322,065, dated July 14, 1885.

Application filed February 27, 1885. (No model.)

*To all whom it may concern:*

Be it known that I, EDWIN NORTON, a citizen of the United States, residing in Chicago, in the county of Cook and State of Illinois, have invented a new and useful Improvement in Soldering-Machines, of which the following is a specification.

This invention relates to machines for soldering the ends of cans, and its object is to provide a machine for soldering up the tops or final heads of filled cans by rolling the same through a bath of molten solder.

Difficulty has been experienced in rolling filled cans through a bath of molten solder by means of the usual traveling chain or belt resting on the cans as employed in the machines heretofore in use, by reason of the chain slipping upon the cans, owing to the weight of such cans, the inclined position of the track and the consequent friction at the lower end of the can, and to the liability of the cans to huddle together and touch each other, as in such machines there is necessarily no means of separating contiguous cans. In operating upon filled cans with the machines above referred to, an example of which is shown in the Letters Patent No. 274,362, granted to me March 20, 1883, it has been found necessary or desirable, in order to do good work and properly solder all the cans with certainty, to roll the cans through the bath or machine at considerable distances apart, which materially diminishes the ordinary capacity of the machine.

To overcome these and other difficulties in operating upon filled cans, and insure a positive and equal rolling and perfect soldering of each can, I have devised the present improvements, which consist in propelling the cans along the inclined track and through the solder bath by means of an endless chain or belt, provided with arms or fingers projecting between and separating the cans, and which operate to push and roll each and every can positively along at the same speed as the chain or belt travels. In this way the chain or belt does not or need not rest upon the cans at all, and there is of course no chance for any slipping of the chain upon the cans. The cans are separated from each other by the pusher arms or fingers, and there is therefore no possibility of their huddling or becoming crowded together; and as each can is positively driven they may be rolled as close together as may be desired, thus utilizing the full capacity of the machine. The endless chain or belt is preferably arranged above the inclined track, so that the can-pusher fingers may project downward between the cans on the track; but it may be arranged below or by the side of the track, and the fingers project upward or horizontally, without departing from the principle of my invention. The cans are automatically delivered to the inclined track and into the pockets or spaces between two contiguous pusher arms by means of a chute. This chute is curved near the sprocket-wheel upon which the endless chain is carried, so that as the pusher-arms are carried around this wheel they will take the cans one by one from the supply chute or trough. The feed-chute or some equivalent feeding device may, however, be located at some other point than near the sprocket-wheel.

In the accompanying drawings, Figure 1 is a side elevation of a machine embodying my invention. Fig. 2 is a plan view; Fig. 3, an end view, and Fig. 4 an enlarged vertical cross-section on line 4 4 of Fig. 1.

In the drawings, A represents the frame of the machine; B, an acid or flux bath; C, the solder bath; D, the endless chain; E, the inclined track, and F the supply-chute. The endless chain D is carried upon the sprocket-wheels D', and in order to keep its lower strand from sagging it is supported in a grooved guide or way, $D^2$, above the cans resting on the inclined track E. The cans are rolled along the track by means of projecting arms or fingers $d$, with which the chain D is provided at suitable intervals. The groove $d'$ in the chain-guide $D^2$ conforms in cross-section to the chain supported therein, and the fingers $d$ project through a slot, $d^2$, in the bottom of the grooved guide. The cans are delivered to the inclined track E, between the can-pusher arms $d$, by a chute, F, located at the front end of the machine, near the sprocket-wheel, and it should be curved to correspond to the circumference of the sprocket-wheel, so that the arms $d$ on the chain as they pass around the wheel will separate the cans and feed them along one by one to the inclined track E. The chain guide or way D² is adjustable up and down to accommodate cans of different diameters by means of the adjusting-screws d³.

G is the driving-belt, by means of which power may be communicated to the sprocket-wheels D′ and the chain D. It is preferable to use an open-link or sprocket-wheel chain for the chain or belt D, in which case the can-pusher arms d will be cast integral with the links of the chain at intervals. The form of these pusher-arms is preferably forked so that the can will bear against it at two points and be pushed and rolled squarely forward without tendency to turn.

E′ is a guide or gage for one end of the cans, on the inclined track E, and E² is a guide or support for the opposite end of the can.

As the construction and operation of the inclined track, acid and solder baths, means for heating the same, &c., are well known to those skilled in the art to which this invention pertains, I have not herein deemed it necessary to show or describe the same in detail, but would refer for a fuller description of such parts of the machine to my former patent, No. 274,362, before mentioned. The cooling-belt shown in said patent I use on the present machine; but it is not herein shown, as the same forms no part of the present invention or improvement.

If an ordinary belt is used instead of a chain, as shown in the drawings, the can-pusher arms d may be secured thereto in any suitable manner.

a represents the cans as they are being rolled through the machine.

I am aware that heretofore machines have been made for soldering square or rectangular cans, wherein endless chains or belts have been provided with can-pusher arms to slide the can along inclined guides or rails through acid and solder baths; but such machines have an entirely different mode of operation from my invention, and the inclined guides or rails used in such machines are such as to about balance the can upon its edge, so that the can-pusher arms in such combination do not and cannot operate to roll a can, but simply serve to slide it along. In my invention I employ a track upon which the cylindrical body of the can rests, and which is inclined at a slight angle, so that it will receive much the greater component of the can's weight, and thus serve the function of permitting the can to roll thereon, while it at the same time inclines the can sufficiently to present the end seam of the can to the solder bath. It is obvious that if this track should be inclined at such an angle that the guide E² at the end of the can would receive and support anything near half the weight of the can, the machine would become inoperative, according to the principle of my invention, and the can-pusher arms, instead of performing their function of rolling the cans, would simply serve to slide them.

I claim—

1. In a soldering-machine, the combination of an acid or flux bath with a track, E, inclined at a slight angle, substantially as shown, to adapt the cans to roll thereon, fixed guides E′ and E², adapted to permit the cans to roll between them upon said track, and an endless chain or belt provided with can-pusher arms at intervals for rolling the cans upon said track, substantially as specified.

2. The combination, with a solder bath, of a track, E, inclined at a slight angle, substantially as shown, to adapt the cans to roll thereon, fixed guides E′ and E², adapted to permit the cans to roll between them upon said track, and an endless chain or belt provided with can-pusher arms for rolling the cans upon said track, substantially as specified.

3. The combination of an inclined track and a solder bath with an endless chain or belt provided with can-pusher arms at intervals slightly in excess of the diameter of the cans operated upon, substantially as shown, and a chute for delivering the cans thereto, whereby the cans are automatically fed to the machine one by one, substantially as specified.

4. The combination of an inclined track and a solder bath with an endless chain or belt provided with can-pusher arms at intervals slightly in excess of the diameter of the cans operated upon, substantially as shown, wheels upon which said endless chain or belt is carried, and a curved supply-chute whereby the cans are automatically fed to the machine one by one, substantially as specified.

5. The combination of a solder bath and a track inclined at a slight angle, to adapt the cans to roll thereon, with an endless chain or belt provided with can-pusher arms, and a guide or way for supporting said chain or belt, substantially as specified.

6. The combination of a solder bath and an inclined track with an endless chain or belt provided with can-pusher arms, and a vertically-adjustable guide or way for supporting said chain or belt, substantially as specified.

7. The combination of solder bath C with track E, endless chain or belt D, provided with arms d, and grooved guide D², provided with slot d³, substantially as specified.

8. The combination of solder bath C with track E, endless chain D, provided with arms d, and adjustable slotted grooved guide D², substantially as specified.

9. The combination of a track with an endless chain or belt, D, provided with can-pusher arms d, and a slotted guide or support for said chain or belt, substantially as specified.

EDWIN NORTON.

Witnesses:
H. M. MUNDAY,
EDMUND ADCOCK.